S. SHERMAN.
Hemp Brake.
No. 63,183.  Patented March 26, 1867.
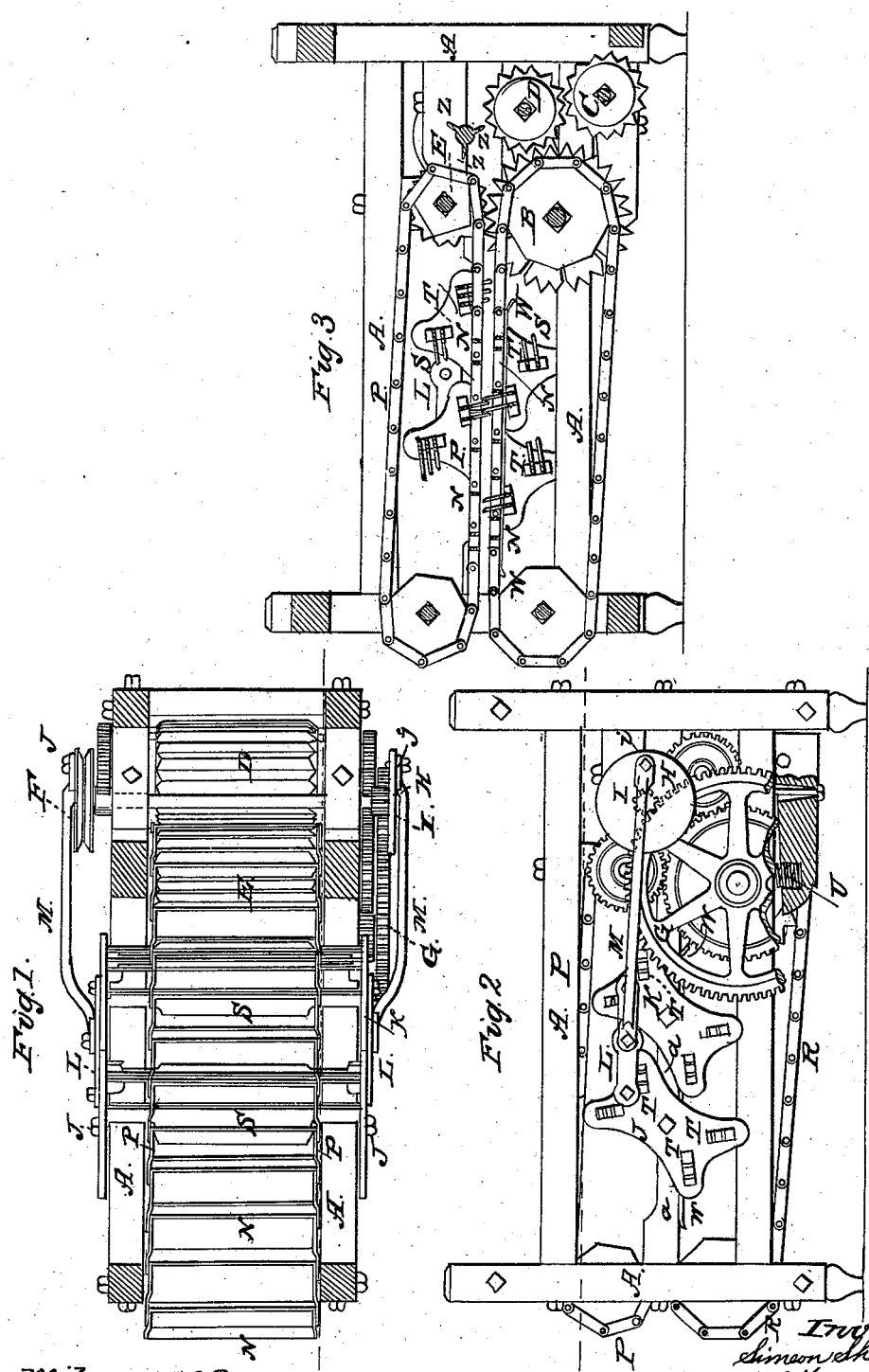

United States Patent Office.

SIMEON SHERMAN, OF WESTON, MISSOURI.

Letters Patent No. 63,183, dated March 26, 1867.

IMPROVEMENT IN HEMP-BRAKES.

*The Schedule referred to in these Letters Patent and making part of the same.*

TO ALL WHOM IT MAY CONCERN:

Be it known that I, SIMEON SHERMAN, of Weston, in the county of Platt, and State of Missouri, have invented a new and improved Hemp-Brake; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a top or plan view.

Figure 2 is a side elevation.

Figure 3 is a longitudinal vertical section on the line $xx$, fig. 1.

The hemp is passed between breaking-rollers, and thence is carried forward by and between endless carriers, where it is exposed to the breaking and loosening action of oscillating beaters above and below, whose teeth strike it in concert between the intervals of the bars of the carrier.

In the drawings, A A is a frame, in which are journalled the toothed rollers B C D E, which are driven by the band or gear-wheel F, which derives its motion from the prime motor, whatever that may be, steam engine, horse, or other power. The toothed roller B is fastened upon the axis of the master-wheel G, and revolves therewith, the outer circle of cogs rotating the pinion H, on to which is attached the crank-wheel I, which gives a reciprocating rotary motion to the oscillating beaters J K, whose journals have bearings in the horizontal bars $a$ of the frame. The reciprocating beaters J K are attached by a yoke, L, and connecting-rod, M, to a wrist, $i$, on the crank-wheel I, the connecting-rod being pivoted to the yoke, and the yoke to the respective beaters J K, so that each revolution of the pinion H completes one series of motions of the beaters, causing the teeth of one beater to engage with those of the other, as shown in fig. 3, which clearly shows their relation to each other and to the bars or slats N of the endless chains P R. The teeth S are in clusters of two or three, and are so placed in their respective bars T that, when the engaging teeth come in conjunction, the upper set with the lower, they alternate with each other, acting upon the upper and under sides of the layer of hemp to break the cortex from the stem, and otherwise disorganize the cellular structure, so as to free the fibrous portion. The journals of the toothed roller C are supported upon springs V, so as to give a certain degree of elasticity to the throat, that is, the space between the rollers C D where the hemp first enters. P R are respectively the upper and lower endless chains, to which the bars or slats N are attached. They pass over rollers whose sides are equal in width to the length of the links, as shown in fig. 3, and are shown as five, seven, eight, and nine-sided, respectively. The rate of motion of the chains P R is uniform, and the diff_rence in diameter of the rollers B E is relative to that of the wheels which impel them.

The operation is as follows: The hemp to be broken is fed in between the rollers C D, and bent upward between B D; thence, passing horizontally between B E, it is carried along between the endless carriers P R, being subjected to the action of the teeth S in the bars of the rotary reciprocating beaters J K. The action of the teeth S is more effective from the fact that the motion of the carriers R R is continuous, while the tendency of the teeth, as their edges pass each other, is to pinch the hemp stems and momentarily arrest their progress. The removed cortex and other refuse drops down through the openings in the lower carrier to the floor. The lower carrier is supported upon flanges or plates W. The drawing shows two reciprocating beaters, but any required number may be placed in succession. The rotary beaters Z, on the shaft of the crank-wheel I, loosen and forward the fibre and stalks as they pass to the carriers.

Having described my invention, what I claim therein as new, and desire to secure by Letters Patent, is—

The endless chains, provided with bars or slats, and operating in connection with the reciprocating rotary beaters, substantially as described.

I claim the arrangement of the beaters whereby the upward blow of the lower set of knives and the downward blow of the upper set are made to conjoin their actions upon the interlying hemp, substantially as described.

I claim the combination, with an endless carrier and reciprocating rotary breaker, of a preliminary series of toothed rollers.

SIMEON SHERMAN.

Witnesses:
L. A. GREEN,
E. H. MEYERROSE.